May 14, 1929.  F. H. BUSHMAN  1,713,167
ANIMAL TRAP
Filed June 24, 1926  7 Sheets-Sheet 5

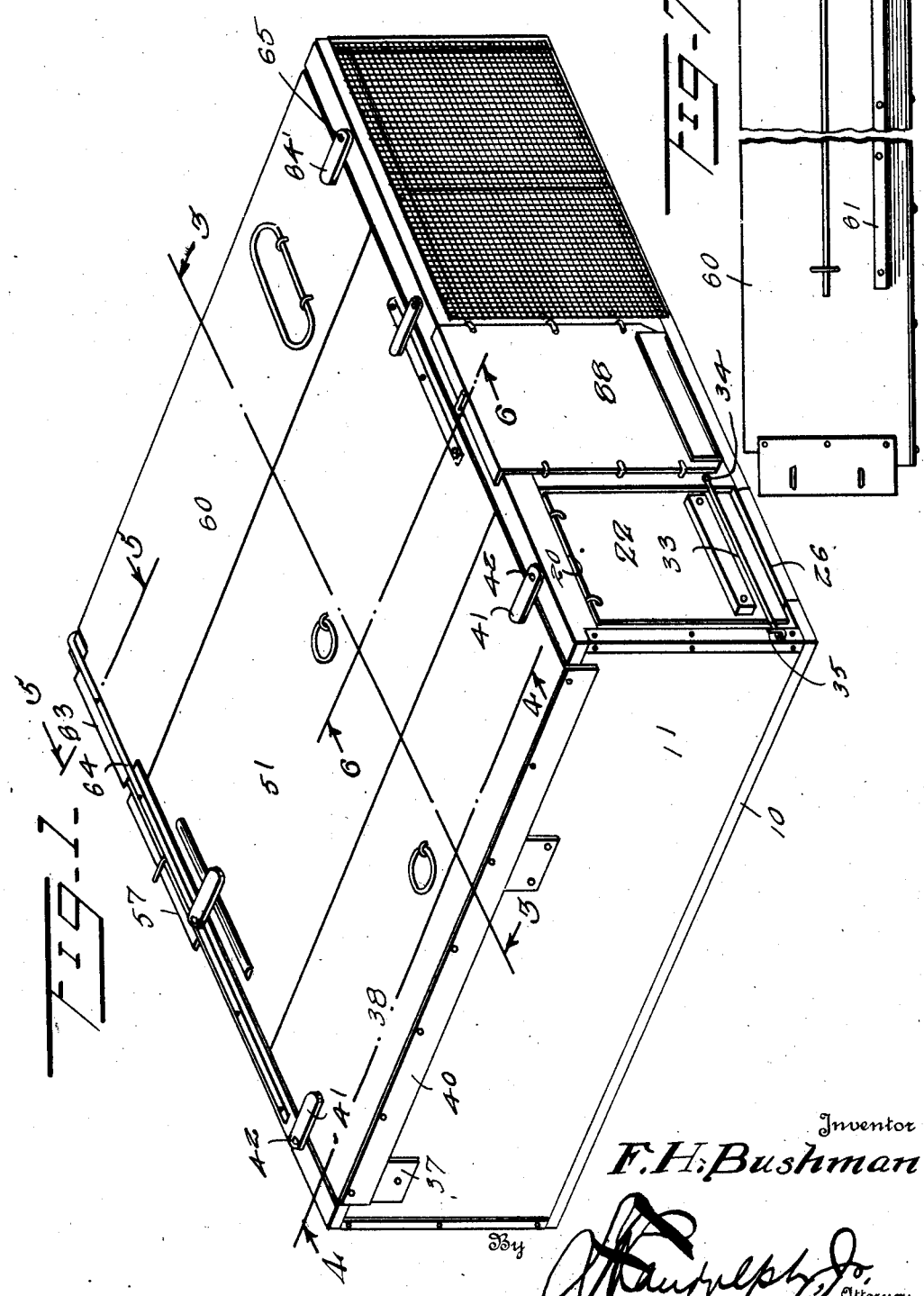

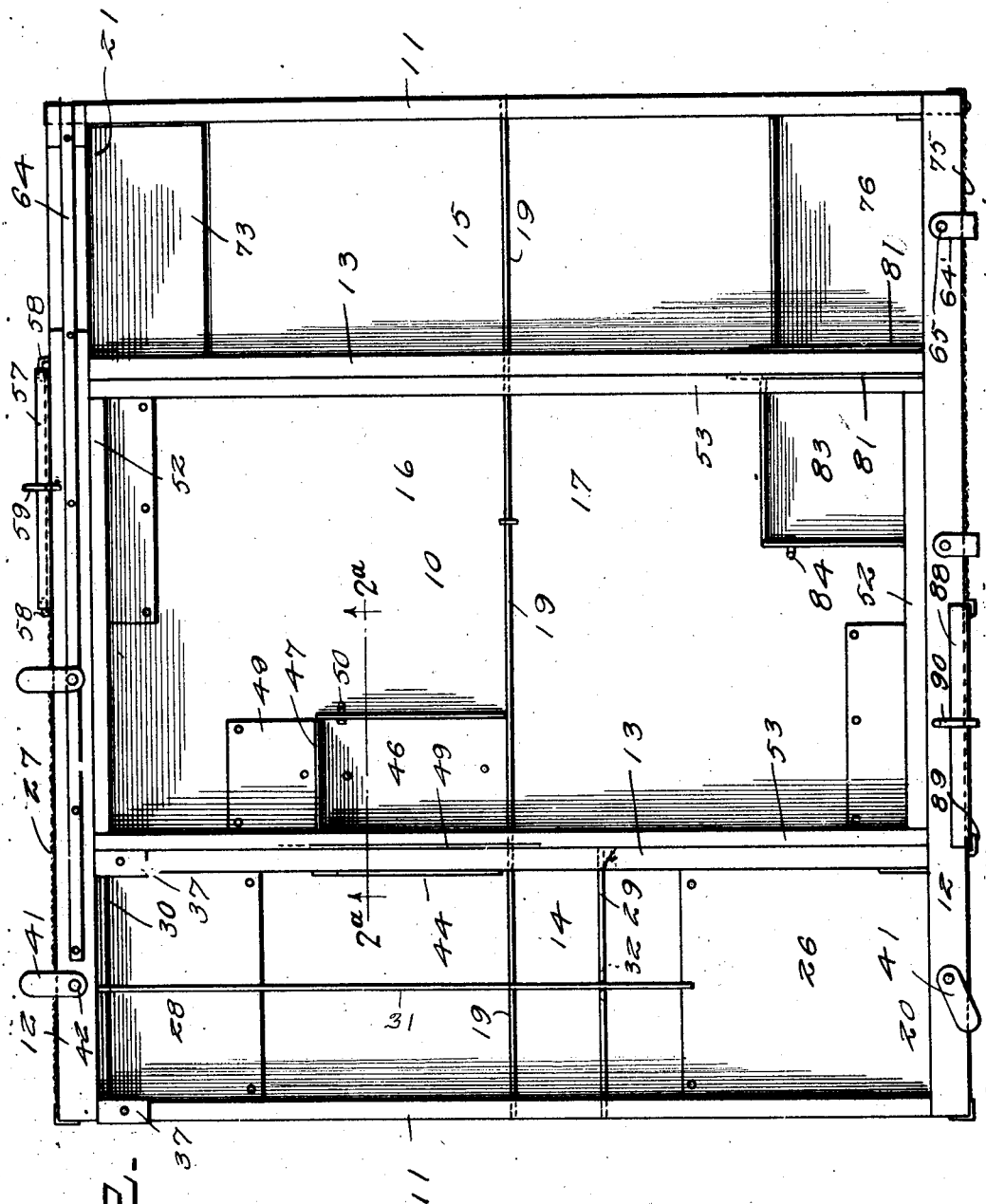

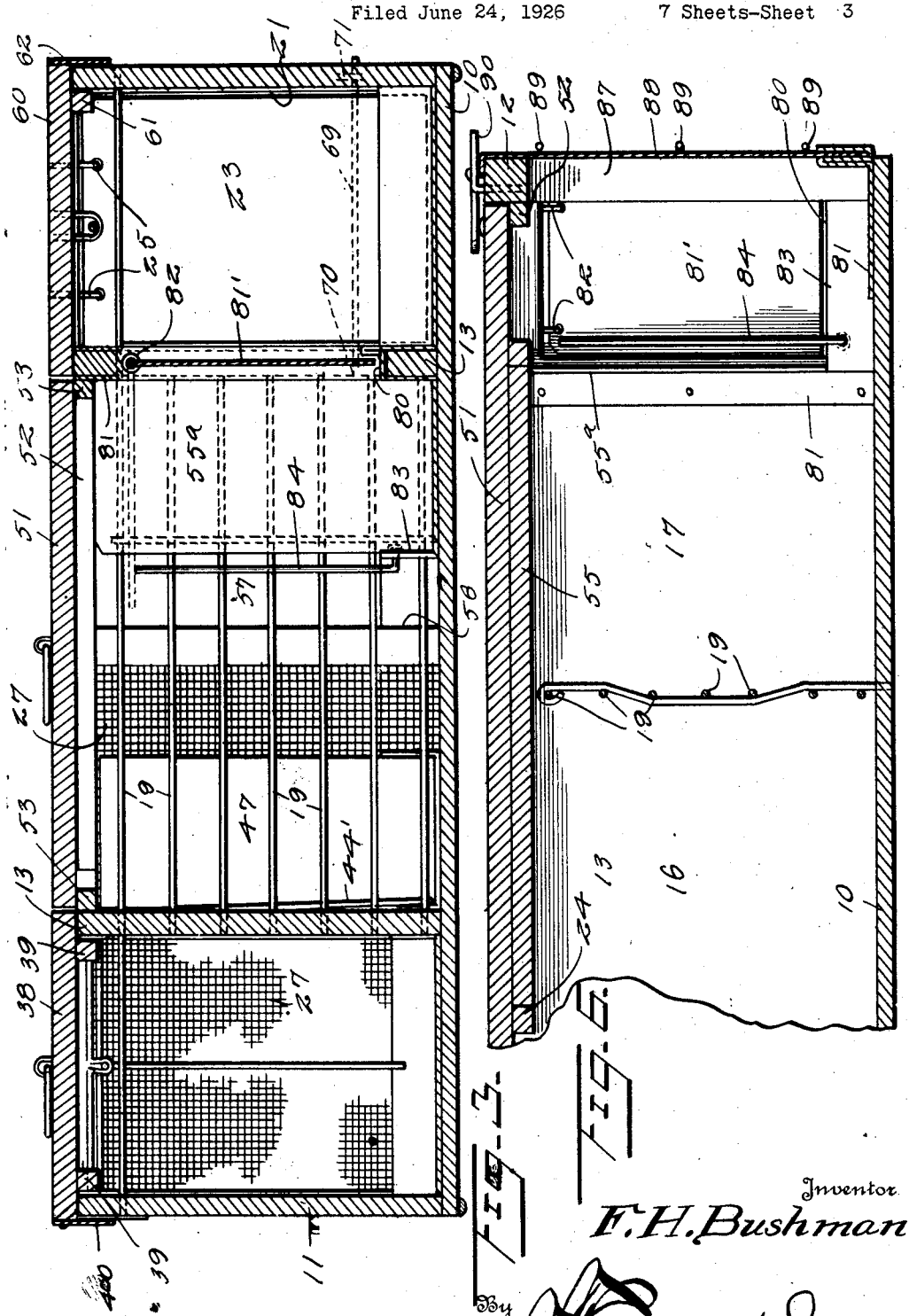

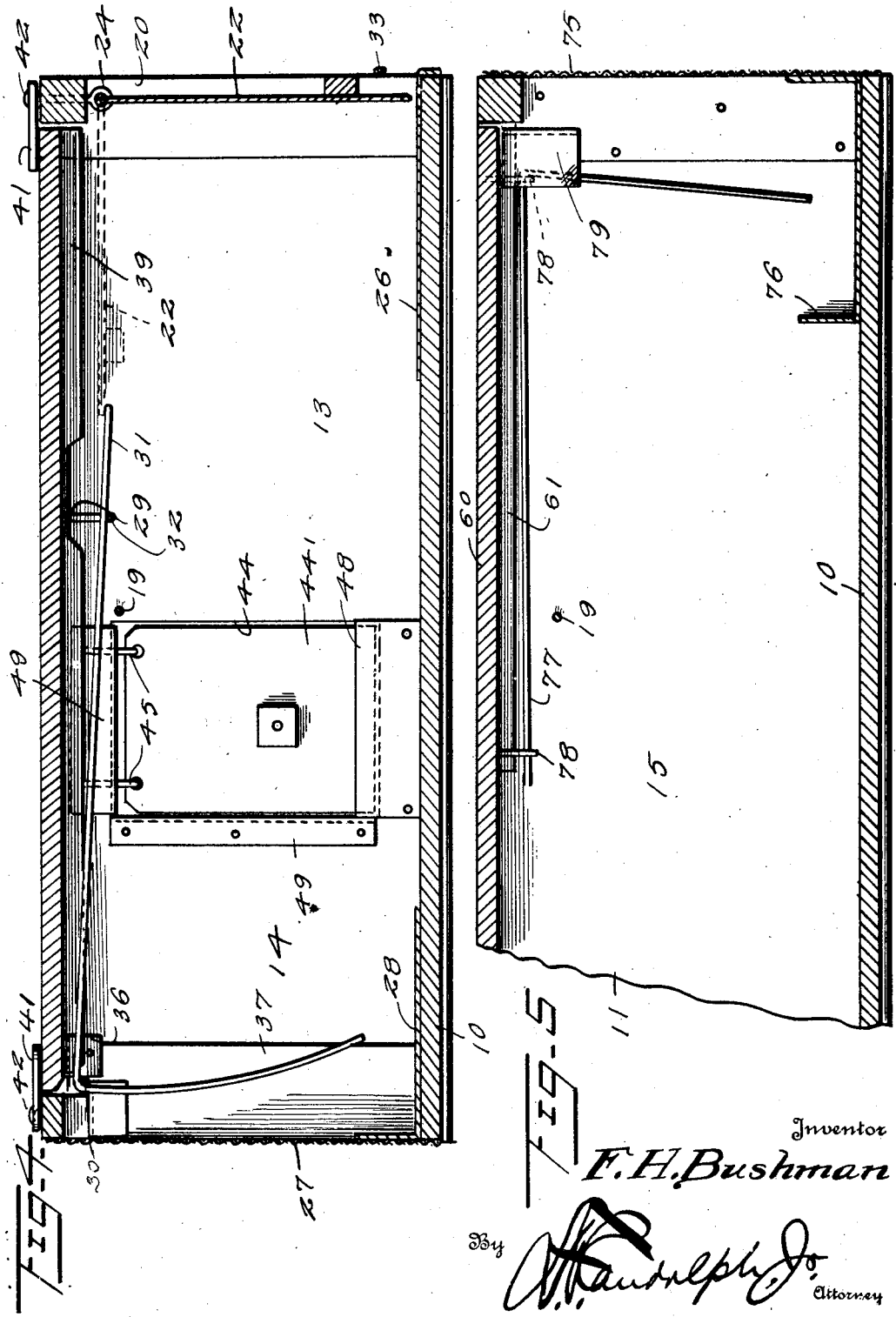

Inventor
F. H. Bushman
By

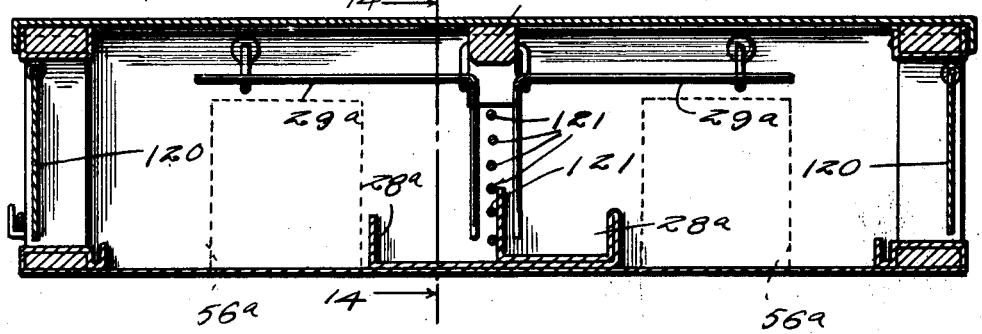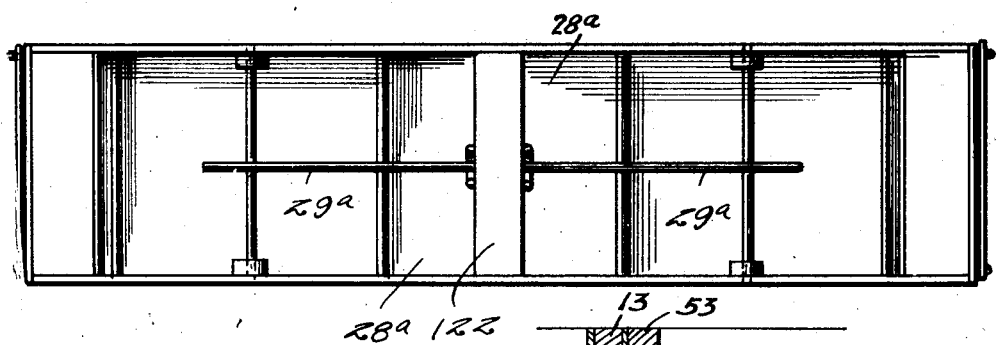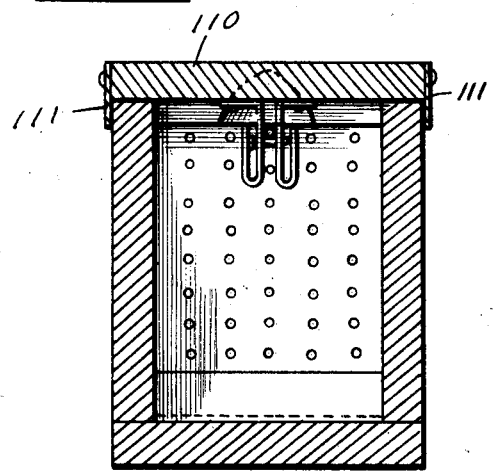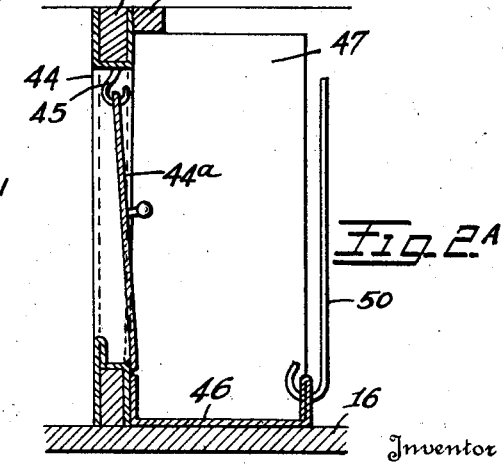

May 14, 1929.  F. H. BUSHMAN  1,713,167
ANIMAL TRAP
Filed June 24, 1926  7 Sheets-Sheet 7
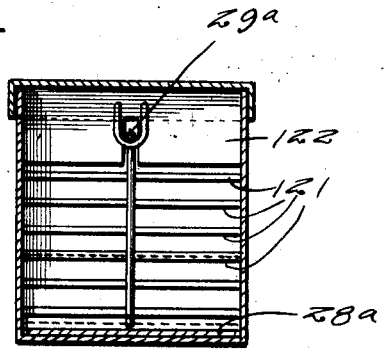
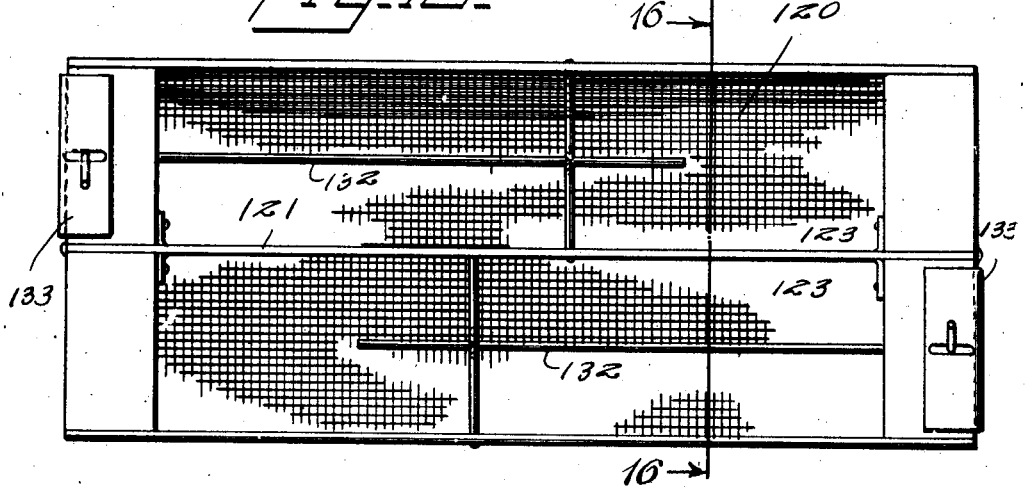
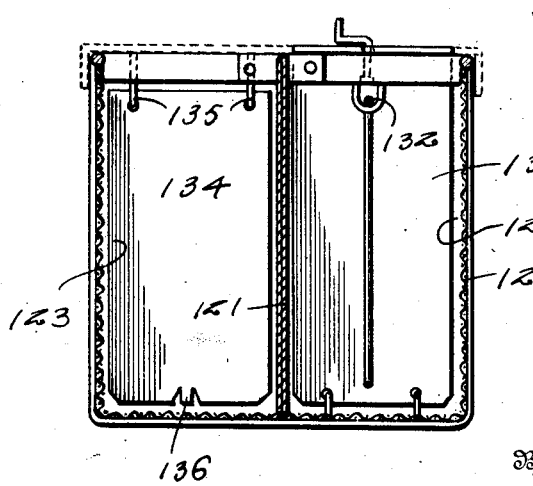
Inventor
F. H. Bushman.

Patented May 14, 1929.

1,713,167

UNITED STATES PATENT OFFICE.

FLETCHER HOUSEMAN BUSHMAN, OF POINT PLEASANT, OHIO.

ANIMAL TRAP.

Application filed June 24, 1926. Serial No. 118,344.

This invention relates to an animal trap which may be used for catching animals generally for destruction, their fur, food or otherwise and for instance rodents, rabbits, squirrels, minks and the like.

It is aimed to provide a novel construction of means whereby the trap doors may be upheld and then released after entrance of the animal.

Another object is to provide a construction wherein the trap has a plurality of compartments adapted to be entered from different sides thereof.

Still another object is to provide a novel construction wherein captive chambers are used to receive the animals from the trap chambers, so that the device may be reset without the necessity of removing the captives.

A further object is to provide a novel construction of top for the trap.

Various additional objects and advantages will become apparent from a consideration of the description following taken in connection with accompanying drawings illustrating an operative embodiment.

In said drawings:—

Figure 1 is a perspective view of the trap;

Figure 2 is a plan view of the trap with the cover sections removed;

Figure 8:
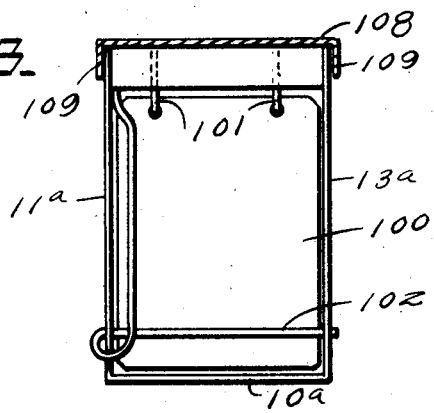
Figure 9:
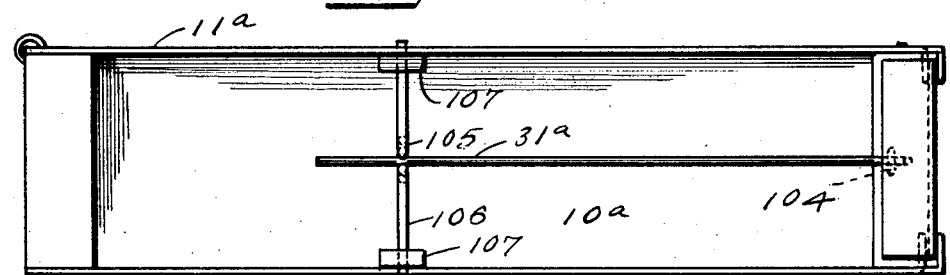
Figure 10:
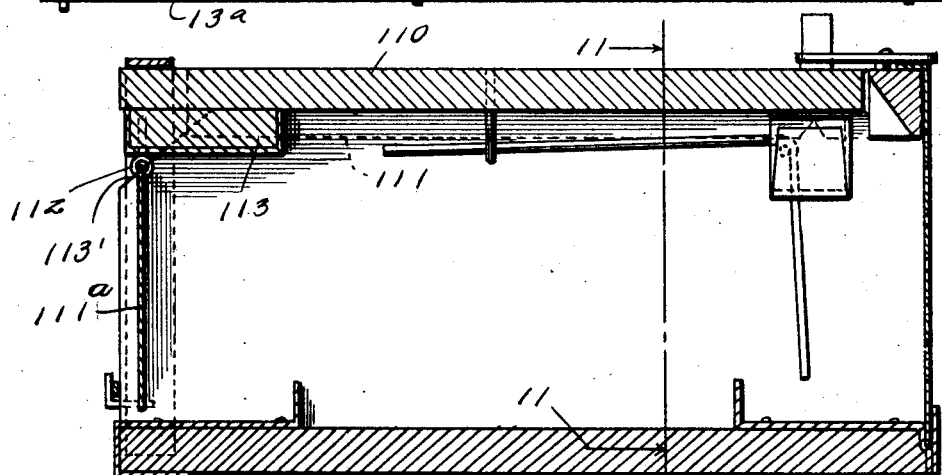

Figure 2$^a$ is a cross sectional view taken on the line 2$^a$—2$^a$ of Figure 2 showing the door to the captive chamber raised;

Figure 3 is a transverse sectional view taken on the line 3—3 of Figure 1;

Figure 4 is a transverse sectional view taken on the line 4—4 of Fig. 1 through one of the traps longitudinally thereof;

Figure 5 is a sectional view taken through the other trap along the line 5—5 of Figure 1 and longitudinally of the trap;

Figure 6 is a sectional view taken longitudinally through the captive chamber and on the line 6—6 longitudinally, of Figure 1;

Figure 7 is a perspective view of one of the trap cover sections inverted;

Figure 8 is a front elevation of a modified form;

Figure 9 is a plan view of such modified form with the cover removed;

Figure 10 is a longitudinal sectional view through a second modified form;

Figure 11 is a cross sectional view taken on the line 11—11 of Figure 10;

Figure 12 is a longitudinal sectional view through a third modified form;

Figure 13 is a plan view of the form of Figure 12, with the cover removed;

Figure 14 is a transverse sectional view taken on the line 14—14 of Figure 12 to show the central barrier;

Figure 15 is a plan view, with the cover removed, of a further modified form;

Figure 16 is a transverse sectional view on the line 16—16 of Figure 15.

Referring specifically to the drawings, the trap has a suitable bottom or base 10 from which parallel sides 11 rise. Said sides are spanned by end bars 12 at the top thereof. In addition, upright walls 13 extend from base 10 parallel to the sides 11 and provide trap chambers 14 and 15 on opposite sides thereof and captive chambers 16 and 17, between them, such chambers 16 and 17 being separated by a suitable barrier in the form of spaced wires or rods 19, the upper wire of which may also extend across the chambers 14 and 15 to brave the various walls. The entrances to the chambers 14 and 15 are at opposite ends of the trap as at 20 and 21, being respectively provided with doors 22 and 23, hinged to swing vertically as on suitable eyelets 24 and 25, respectively. The eyelets 24 are fastened to the under surface of one of the end bars 12. Around the entrance 20, metal plates are used as at 26, to prevent a captive animal from gnawing the trap in an endeavor to escape. The other end of chamber 14 and part of chamber 16 are closed by wire netting or other reticulate material as at 27. Bait to lure an animal into the chamber 14 is adapted to be contained on a stationary tray 28 on the base 10 and adjacent the netting 27. Rods 29 and 30 span the chamber 14 at the top and an L-shaped trip 31 has its upper leg slidably mounted on said rod 29, the rod 29 having a loop at 32 to facilitate the sliding movement. The depending leg of the trip 31 terminates close to and over the tray 28. The trip 31 is of such length that it may be placed slightly under the door or closure 22 when the trap is set so that an animal may see the bait or smell the bait on the tray 28 and thus be lured into the trap. Such animal will be bound to strike the depending leg of the trip 31, and thus move the trip out of supporting relation to the door or closure 22, whereupon the latter by gravity falls to a closed position and the animal accordingly is caught. The movement of door 22 to closed position is limited by its abutment against a bar 33, pivoted at 34 to one of the walls 13 and engageable with a hook 35 on one of the sides 11. Such bar 33 by reason of this construction may be displaced when it is desired to swing the door outwardly, when resetting the trap or removing a captive. The trip 31 is readily operable manually by inserting the hand through the doorway 20 into the chamber 14. A pivotal movement of the trip 31 is prevented by ears 36 depending from the adjacent end bar 12. Metal strips 37 surround portions of the chamber 14 adjacent the netting 27, so that the animals cannot gnaw the trap in an endeavor to escape.

The chamber 14 is covered by a top or section 38 which rests on top of one of the sides 11 and one of the upright walls 13, with the ends abutting the end bars 12. Said cover 38 has depending strips 39 extending into chamber 14 and engaging the adjacent walls 11 and 13 and also has a metallic strip at its outer longitudinal edge as at 40, to overlap the upper edge of the adjacent side 11. Said cover 38 is removably secured against upward displacement as by means of buttons or latches 41, pivoted at 42 as to the end bars 12.

Animals captured in the trap chamber 14 are adapted to enter the captive chamber 16 through a way 44 provided in the adjacent wall 13. Such way is provided with a door 44$^a$ which is pivotally hung on eyelets 45, fastened to the wall 13 adjacent the same. In chamber 16, on the base 10 in front of the way 44 is a bait tray 46 and rising therefrom is a guard wall 47, to prevent return of rodents through the way 44 upon opening of the door 44$^a$. In order to prevent the door 44$^a$ from swinging past closed position, an abutment 48 may be provided on the tray 46 being engaged thereby and also the way 44 may be lined as at 49 with suitable metal strips to prevent the animals from gnawing through the trap to effect their escape. When the trap is initially set, the door 44$^a$ is elevated and so held by a trigger 50, which is pivoted to a wall of the tray 46. The animal in entering the chamber 16 engages the trigger 50, displacing it and accordingly the door 44' by gravity moves to closed position. Thereafter, the trap may be reset by elevating the door 22 and properly disposing the trip 31 with respect thereto. The door 44$^a$ however is left closed and after a second animal is captured, the same will be lured into the chamber 16 by the animal therein and also by the bait on tray 46, itself displacing the door 44$^a$ to gain entrance.

A cover section 51 is removably disposed over the chambers 16 and 17, resting at its ends on ledges 52 fastened to the end bars 12, and resting at its longitudinal edges on ledge strips 53 fastened to the walls 13. A block 55 depends centrally from cover section 51 in order to be engaged by the upper end of the guard 47 to brace the same and the upper end of a corresponding guard 55$^a$, for the same purpose.

Captives may be removed from the chamber 16 through a way 56 covered by vertically slidable closure plates 57, guided by elements 58 and held against upward displacement by a latch 59 adapted to swing on a vertical axis from and across the path of movement thereof.

The trap chamber 15 has a removable top or cover section as at 60, provided with a depending strip 61 and a depending metallic plate or strip 62, in spaced relation, adapted to receive the upper end portion of the adjacent side wall 11 between them and this section 60 also has a forward reduced portion or nose 63 adapted to extend under a strap 64 bracing the parts of the top of the opening 21. This cover is, like the cover or section 51, secured against accidental displacement by means of buttons as at 64', pivoted at 65 to the end bars 12 for movement across or away from the same. At the entrance to the chamber 15, a door 23 is provided which is hingedly suspended from eyelets 25 on the cover section 60. Said door is limited to closed position by engagement with a bar 69 spanning the entrance chamber 15, which bar is pivoted as at 70 and engages a hook as at 71, whereby it may be displaced so that door 23 may be completely opened for resetting of the trap or release of an animal therethrough, if desired. The parts about the doorway 21 are lined with metal as at 73 in order to prevent the animals gnawing the trap successfully about the same. At the rear end, the chamber 15 and a portion of the chamber 17 is closed by open work or reticulate wall as of netting at 75 and in front of the same, a bait tray or the like 76 is provided to contain the bait to lure the animal into the tray. The door or closure 23 may be held elevated by an L-shaped trip 77, similar to the trip 31, but in this instance, being slidably supported on the under surface of the cover 60 as through eyelets 78. Displacement and lateral or turning movement of the trip 77 is avoided by the provision of a bracket 79 depending from the cover section 60.

A way 80 is provided through the adjacent wall 13 to the chamber 17 to function similarly to the way 44, and being similarly lined with metal as at 81 so that captives cannot successfully gnaw the trap. Said way 80 is closed by a door 81', pivotally hung on eyelets 82 on the adjacent wall 13. The guard 55$^a$ is disposed at one side of the way 80 within the chamber 17 and also within said captive chamber 17 adjacent the way 80 is a bait tray or receptacle 83, for use similarly to that at 46. A trigger 84 may be pivoted to tray 83 and used to hold the door 81 elevated until the chamber 17 is entered whereupon the animal will strike such trigger, displacing it and releasing the door for closing. Captives from the chamber 17 may be removed through a way at 87, normally covered by a closure 88 similar to the closure plate 57, guided by elements as at 89, and having a cooperating latch at 90.

A modified form of trap chamber is shown in Figures 7, 8 and 9. This form has walls 11$^a$ and 13$^a$ corresponding to those at 11 and 13, also having a suitable base 10$^a$, the cover not being shown. The entrance is provided with a door or closure 100, suspended from eyelets 101, and is limited to movement from closed position by a fixed abutment 102. The trip used is designated 31$^a$ and is similar to that as 31, being guided adjacent one end in an eyelet 104 and at its other end in a loop 105 forming part of a rod 106 journaled or pivoted in the walls 11$^a$ and 13$^a$ and held against lateral displacement by the angular ends of such rods at 104 and by disks on the rod within the trap as at 107. In this form, the cover may be of sheet metal and be designated 108 and having depending flanges at all four sides thereof as at 109 to aid in securing it in place.

A second modified form is shown in Figures 10 and 11 but the trap there shown conforms substantially to that as illustrated at 15. The cover for the trap is shown at 110, having plates 111 at each side thereof to secure the same to the upright wall of the trap. The trip is suspended from the section 110. The entrance door to the trap is shown at 111$^a$ and pivotally suspended from eyelets 112 supported from a block 113 fastened to the under side of section 110. Also the side walls of this trap are cut away adjacent the forward upper ends thereof and inclined as at 113 so that a more compact arrangement may be effected with parts of proper proportion and efficiency.

A third modified form is shown in Figures 12 and 13 wherein the trap chamber mainly is double-end construction, that is each end serving as a trap. It will be noted that doors are used at each end as at 120 similar to those at 22. A barrier is provided midway of the ends of this trap consisting for instance of the rods 121 and the bar 122. The trips used in connection with the doors are similar to those at 31 and supported in substantially the same manner, the rods 29$^a$ however, the equivalent of those at 29, being supported by the transverse bars just mentioned. The arrangement of the bait trays 28 is duplicated as at 28$^a$. Outlets 56$^a$ lead from this trap at each side of the said barrier to a captive chamber or chambers.

It is to be noted that the traps of Figures 8 to 14 may be complete traps in themselves, by omitting the ways whereby the animals are adapted to escape into captive chambers.

Still another form is shown in Figures 15 and 16. Such trap may consist of a body of reticulate or other material 120 divided by a central longitudinal partition 121. A trap space 123 is provided on each side of the partition and therein trips 132 similar to those at 31 are used. Such trap chambers are closed at opposite ends as at 133 and their other ends are provided with entrance doors 134, pivoted to eyelets as 135, such doors preferably having fingers as at 136 for engagement with trips 132.

Various changes may be resorted to provided they fall within the spirit and scope of the invention.

I claim as my invention:—

A trap of the class described having a trap chamber, a captive chamber in communication therewith through a way, a closure for said way, a guard within the captive chamber coacting with said closure, a bait holding means within the captive chamber, an animal-operated means within the captive chamber to support said closure in open position, said means being carried by the bait receptacle, and said closure being movable inwardly to said captive chamber, and means to prevent the closure moving into the trap chamber.

In testimony whereof I affix my signature.

FLETCHER HOUSEMAN BUSHMAN.